United States Patent
Sawada et al.

(10) Patent No.: US 7,026,383 B2
(45) Date of Patent: Apr. 11, 2006

(54) POLYAMIDE RESIN COMPOSITION AND MOLDED ARTICLE THEREOF

(75) Inventors: Masahiro Sawada, Sodegaura (JP); Yoshimasa Ogou, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/607,519

(22) Filed: Jun. 27, 2003

(65) Prior Publication Data
US 2004/0002565 A1    Jan. 1, 2004

(30) Foreign Application Priority Data
Jun. 28, 2002  (JP)  ............................. 2002-191454

(51) Int. Cl.
C08K 5/11    (2006.01)
C08L 77/00   (2006.01)

(52) U.S. Cl. ...................... 524/318; 524/317; 524/425; 524/430; 524/449; 524/456; 524/538

(58) Field of Classification Search ................ 524/318, 524/317, 425, 430, 449, 456, 538
See application file for complete search history.

(56) References Cited

U.S. PATENT DOCUMENTS
5,183,843 A    2/1993  Sakai et al.

FOREIGN PATENT DOCUMENTS
JP    2763348 B2    3/1998
JP    11-12460      1/1999

*Primary Examiner*—Ana Woodward
(74) *Attorney, Agent, or Firm*—Birch, Stewart, Kolasch & Birch, LLP

(57) ABSTRACT

A polyamide resin composition comprises a polyamide resin component (A) and a metallic soap component (B), wherein the polyamide resin component (A) comprises a dicarboxylic acid component (a-1), which comprises a terephthalic acid component and an aromatic dicarboxylic acid component other than the terephthalic acid component and/or an aliphatic dicarboxylic acid component of 4 to 20 carbon atoms, and a diamine component (a-2), which comprises an aliphatic diamine component; and the metallic soap component (B) comprises a metallic soap comprising an aliphatic carboxylic acid and a monovalent or divalent metal salt The polyamide resin composition has excellent heat resistance and is favorably used as a molding material for electric or electronic parts and automotive parts. The polyamide resin composition is excellent in flowability, mold-releasing properties and shot stability in the injection molding process.

6 Claims, No Drawings

POLYAMIDE RESIN COMPOSITION AND MOLDED ARTICLE THEREOF

FIELD OF THE INVENTION

The present invention relates to a polyamide resin composition and a molded article thereof. More particularly, the invention relates to a polyamide resin composition, which has such an excellent heat resistance as to be favorable as a molding material particularly for electric or electronic parts and automotive parts and is excellent in flowability, mold-releasing properties and shot stability in the injection molding process, and to a molded article thereof.

BACKGROUND OF THE INVENTION

As polyamides, nylon 6, nylon 66 and the like have been heretofore widely known. Since these aliphatic polyamides have excellent moldability, they have been widely employed for automotive parts, electric or electronic parts and mechanical parts.

On the other hand, polyamide resins having high heat resistance have been enthusiastically developed, and a high heat-resistant resin composition comprising nylon 6T containing hexamethylene diamine and terephthalic acid as main components has been put into practical use.

In recent years, downsizing (reduction in weight, thickness and size) of electronic equipments, enhancement of performance (increase of frequency) thereof and making the electronic equipments portable (mobile, movable) have been rapidly promoted. With such promotion, high-density mounting technique of printed circuit boards (PCB) and reduction in size of the parts have become indispensable.

As the high-density mounting technique, surface-mount technique (SMT) is now widespread, and lead-free solder has come into wide use at the present day. Under such circumstances, higher heat resistance is required for the parts to be mounted, and with the reduction in size of the parts, higher flowability is required for the resins used for injection molded articles.

On the other hand, the resins for large-sized parts such as automotive parts need to have such high flowability that they can be filled in a cavity in the injection molding process, and besides, they also need to have excellent mold-releasing properties in order to prevent deformation due to lack of mold-releasing properties.

In case of the aforesaid polyamides, however, thermal deformation of the parts or melting of the resins sometimes takes place during the mounting process using SMT, or the polyamide resins are sometimes unsuitable for molding into automotive parts because of lack of flowability or stick in mold.

As high heat-resistant polyamide, nylon 46 is known, and its thermal deformation temperature is higher than that of the conventional polyamides. However, it has a problem that because of high water absorption, water contained in the resin is vaporized in the mounting process to cause blisters on the surface of the part.

Under such circumstances as mentioned above, the present inventors have proposed, in JP2763348B2 (U.S. Pat. No. 5,183,843), a polyamide resin composition comprising an aromatic polyamide, which comprises a dicarboxylic acid component (a) comprising terephthalic acid, an aromatic dicarboxylic acid other than the terephthalic acid and/or an aliphatic dicarboxylic acid of 4 to 20 carbon atoms, and a diamine component (b) comprising an aliphatic diamine and/or an alicyclic diamine, a fibrous reinforcement and a derivative of an aliphatic carboxylic acid of 26 to 32 carbon atoms.

Since the above polyamide resin composition is relatively excellent in heat resistance, rigidity, flowability, mold-releasing properties, etc., it is widely used as a molding material for electric or electronic parts and automotive parts.

If reduction in size of the parts used for PCB is promoted as described above, high flowability of the resin is desired in order to fill the resin into the end of the mold for the parts. The conventional polyamide resin compositions, however, have insufficient flowability, and hence they cannot be filled into the end of the mold for the parts in some cases.

Further, the conventional polyamide resin compositions are often reinforced with fibrous fillers such as glass fiber, and in this case, the flowability is sometimes deteriorated by the fibrous fillers. Accordingly, development of a polyamide resin composition having excellent heat resistance and also having high flowability and excellent mold-releasing properties has been desired, whether the resin contains a fibrous filler or not.

SUMMARY OF THE INVENTION

An object of the invention is to provide a polyamide resin composition which has such an excellent heat resistance as to be favorable as a molding material particularly for electric or electronic parts and automotive parts and is excellent in flowability, mold-releasing properties and shot stability in the injection molding process, and a molded article thereof.

In order to solve the above problems, the present inventors have studied the components for constituting flame-retardant polyamide resin compositions, and as a result, they have found a polyamide resin composition which has such an excellent heat resistance as to be favorable as a molding material particularly for electric or electronic parts and automotive parts and is excellent in flowability, mold-releasing properties and shot stability in the injection molding process.

Specifically, the above-described objects of the present invention have been achieved by providing a polyamide resin composition comprising a specific polyamide resin and a specific metallic soap.

The polyamide resin (component (A)) for constituting the polyamide resin composition of the invention comprises a dicarboxylic acid component (a-1) comprising a terephthalic acid component, and an aromatic dicarboxylic acid component other than the terephthalic acid component and/or an aliphatic dicarboxylic acid component of 4 to 20 carbon atoms, and a diamine component (a-2) comprising an aliphatic diamine component.

In the polyamide resin composition of the invention, a metallic soap component (B) comprising an aliphatic carboxylic acid of 20 to 25 carbon atoms and a monovalent or divalent metal salt is contained in an amount of 0.01 to 5 parts by weight based on 100 parts by weight of the polyamide resin component (A).

The intrinsic viscosity of the polyamide resin, as measured in 96.5% sulfuric acid at 25° C., is preferably in the range of 0.5 to 3.0 dl/g.

The melting point of the polyamide resin, as measured by a differential scanning calorimeter (DSC), is preferably in the range of 280 to 330° C.

The polyamide resin composition of the invention preferably further contains a filler in an amount of 1 to 300 parts by weight based on 100 parts by weight of the polyamide resin component (A).

The molded article of the invention comprises the above-mentioned polyamide resin composition.

DETAILED DESCRIPTION OF THE INVENTION

The polyamide resin (component (A)), the metallic soap (component (B)), the fibrous filler and other additives to be used in the polyamide resin composition of the invention and the molded article are described in detail hereinafter.

Polyamide Resin (Component A))

As the polyamide resin (component (A)) for the invention, the following resin is preferably employed.

The polyamide resin component (A) comprises a dicarboxylic acid component (a-1) and a diamine component (a-2).

The dicarboxylic acid component (a-1) comprise a terephthalic acid component, and an aromatic dicarboyxlic acid component other than the terephthalic acid component and/or an aliphatic dicarboxylic acid component of 4 to 20 carbon atoms. Examples of the aromatic dicarboxylic acids other than terephthalic acid include isophthalic acid, 2-methylterephthalic acid, naphthalenedicarboxylic acid and combinations of these acids. Examples of the aliphatic dicarboxylic acids of 4 to 20 carbon atoms include adipic acid, suberic acid, azelaic acid, sebacic acid, decanedicarboxylic acid, undecanedicarboxylic acid, dodecanedicarboxylic acid, and combinations of these acids. Particularly preferable is adipic acid.

In the present invention, it is preferable that the terephthalic acid components are contained in amounts of 40 to 100% by mol, the aromatic dicarboxylic acid components other than terephthalic acid are contained in amounts of 0 to 60% by mol, and the aliphatic dicarboxylic acid components of 4 to 20 carbon atoms, preferably 4 to 12 carbon atoms, are contained in amounts of 0 to 60% by mol, with the proviso that the total amounts of the components (a-1) derived from all the dicarboxylic acids are 100% by mol.

In the present invention, a polycarboxylic acid may be contained in a small amount, for example, about not more than 10% by mol, together with the above-mentioned dicarboxylic acids. Examples of the polycarboxylic acids include tribasic acids, such as trimellitic acid, and polybasic acids, such as pyromellitic acid.

The diamine component (a-2) comprises an aliphatic diamine component. Examples of the aliphatic diamines include 1,6-diaminohexane, 1,7-diaminoheptane, 1,8-diaminooctane, 1,10-diaminodecane, 1,11-diaminoundecane and 1,12-diaminododecane. Particularly preferable is 1,6-diaminohexane.

The diamine component for the invention may have a side chain such as a methyl group or an ethyl group. Examples of such diamine components include 2-methyl-1,5-diaminopentane, 2-methyl-1,6-diaminohexane, 2-methyl-1,7-diaminoheptane, 2-methyl-1,8-diaminooctane, 2-methyl-1,9-diaminononane, 2-methyl-1,10-diaminodecane and 2-methyl-1,11-diaminoundecane. Of these, 2-methyl-1,5-diaminopentane is particularly preferable.

As the diamine component, a straight-chain aliphatic diamine component and an aliphatic diamine component having an alkyl group as a side chain may be each used singly, or a mixture of these diamines in an arbitrary mixing ratio may be used.

The polyamide resin (A) for the invention can be prepared by blending the dicarboxylic acid component (a-1) with the diamine component (a-2), and heating them in the presence of a catalyst. In this reaction, it is preferable to use those component in such a manner that the total number of moles of the diamine component is larger than the total number of moles of the dicarboxylic acid component, and it is particularly preferable to use 100 to 120 mol of the whole diamine component based on 100 mol of the whole dicarboxylic acid component. This reaction is usually carried out in an atmosphere of an inert gas, and the reaction vessel is generally purged with an inert gas such as a nitrogen gas. In order to control the polycondensation reaction of polyamide, it is desirable to previously enclose water in the reaction system, and in the water, a water-soluble organic solvent, e.g., an alcohol such as methanol or ethanol, may be contained.

Examples of the catalysts used for preparing the polyamide resin component (A) for use in the invention include phosphoric acid, salts of phosphoric acid, phosphate compounds, phosphorous acid, salts of phosphorous acid, phosphite compounds, hypophosphorous acid, salts of hypophosphorous acid, and hypophosphite compounds.

Of these, preferable are sodium phosphate, sodium phosphite, potassium hypophosphite and sodium hypophosphite.

The above phosphoric acid compounds can be used singly or in combination. The phosphoric acid compound is used in an amount of usually 0.01 to 5 mol, preferably 0.05 to 2 mol, based on 100 mol of the dicarboxylic acid component.

In the preparation of the polyamide resin for the invention, it is preferable to use an end capper.

Examples of the end cappers employable herein include benzoic acid, alkali metal salts of benzoic acid and acetic acid. The end capper is used in an amount of usually 0.1 to 5 mol, preferably 0.5 to 2 mol, based on 100 mol of the dicarboxylic acid component. By controlling the amount of the end capper used, the intrinsic viscosity [η] of the resulting polycondensate can be controlled.

The reaction conditions for preparing the polycondensate are specifically as follows. The reaction temperature is in the range of usually 200 to 290° C., preferably 220 to 280° C., and the reaction time is in the range of usually 0.5 to 5 hours, preferably 1 to 3 hours. Although the reaction can be carried out at atmospheric pressure or under pressure, it is preferably carried out under pressure. The reaction pressure is in the range of usually 2 to 5 MPa, preferably 2.5 to 4 MPa. Through the polycondensation reaction under such conditions, a low condensate having an intrinsic viscosity [η], as measured in 96.5% sulfuric acid at 25° C. by the use of an Ubbellohode viscometer, of usually 0.05 to 0.6 dl/g, preferably 0.08 to 0.3 dl/g, can be obtained.

The polyamide low condensate thus formed in the aqueous medium is separated from the reaction solution. For the separation between the polyamide low condensate and the reaction solution, for example, filtration or centrifugal separation is adoptable, but it is efficient to perform solid-liquid separation by flushing the reaction solution containing the formed semi-aromatic polyamide low condensate into the atmosphere through a nozzle.

In the present invention, the polyamide low condensate obtained as above is then subjected to post polymerization.

For the post polymerization, the polyamide low condensate is dried and then heated to a molten state, and the polymerization is carried out with applying shear stress to the molten resin. In this reaction, the dried polyamide low condensate is heated to a temperature at which the polyamide low condensate is at least melted. The dried polyamide low condensate is heated generally to a temperature higher than the melting point of the polyamide low condensate, preferably to a temperature higher than the melting point by 10 to 60° C.

The shear stress can be applied to the molten resin by the use of, for example, a vented twin-screw extruder or a kneader. It can be thought that by applying shear stress to the molten resin as described above, the dried polyamide low condensate in a molten state mutually undergoes polycondensation, and additionally, the resulting condensate also undergoes polycondensation reaction.

In another process for preparing the polyamide resin for use in the invention, the above-mentioned polyamide low condensate is subjected to solid phase polymerization through a generally known process, whereby polyamide having an intrinsic viscosity [η], as measured by the aforesaid method, of 0.5 to 2.0 dl/g can be prepared. In a further process for preparing the polyamide resin for use in the invention, the above-mentioned polyamide low condensate is subjected to solid phase polymerization through a generally known process to prepare a polyamide precursor having an intrinsic viscosity [η] of 0.5 to 1.5 dl/g and then the precursor is subjected to solution polymerization to prepare polyamide having an intrinsic viscosity [η] of 0.8 to 3.0 dl/g. The polyamide having an intrinsic viscosity [η] of this range exhibits excellent flowability and high toughness.

The polyamide resin for use in the invention is crystalline and it has a melting point. The melting point is determined as follows. The polyamide resin obtained by the above process is heated at a rate of 10° C./min by the use of a differential scanning calorimeter (DSC) to measure an endothermic peak based on the melting of the polyamide resin, and the endothermic peak is regarded as a melting point. As a result, the melting point of the polyamide resin is in the range of preferably 270 to 340° C., particularly preferably 280 to 330° C. The polyamide resin having a melting point of this range can exhibit excellent heat resistance.

The polyamide resin for the invention is heated to a temperature higher than the melting point and lower than the decomposition temperature of the polyamide resin, and can be molded into a desired shape using a usual molding apparatus. Especially by the injection molding of the polyamide resin, electric or electronic parts and automotive parts can be efficiently produced.

Metallic Soap (Component (B))

As the metallic soap (component (B)) for the invention, the following one is preferably employed.

The metallic soap component (B) comprises an aliphatic carboxylic acid of 20 to 25 carbon atoms and a monovalent or divalent metal salt. The aliphatic carboxylic acid of 20 to 25 carbon atoms is not specifically restricted, but preferred examples thereof include arachic acid (20 carbon atoms), behenic acid (22 carbon atoms), lignoceric acid (24 carbon atoms) and pentacosanoic acid (25 carbon atoms). The aliphatic carboxylic acid may have, as the side chain, an alkyl group, such as a methyl group or an ethyl group, or a functional group, such as a hydroxyl group. Of the above acids, behenic acid or lignoceric acid is particularly preferable. Although the monovalent or divalent metal contained in the metallic soap component (B) is not specifically restricted, Li, Na, Mg, K, Ca of the like is preferably employed.

As the metallic soap (component (B)), any of metallic soaps generally used can be widely used as long as it is in the above range. The metallic soap can be prepared by, for example, a double decomposition method or a direct method, using a fatty acid and a metal salt aqueous solution as starting materials.

In the present invention, a mixture of plural kinds of the metallic soaps (components (B)) may be used, or the metallic soap (component (B)) may be used in combination with a metal salt of an aliphatic carboxylic acid of 16 to 18 carbon atoms and/or a metal salt of an aliphatic carboxylic acid of 26 to 32 carbon atoms, within limits not detrimental to the object of the present invention.

The metallic soap component (B) for the invention is added to the polyamide resin or the polyamide resin composition by a dry blending method or a melt blending method using a twin-screw extruder. In case of a polyamide resin composition containing a filler, it is preferable from the viewpoint of flowability of the resulting resin composition that the polyamide resin is melt blended with a filler by a twin-screw extruder and then the polyamide resin composition obtained by melt blending is dry blended with the metallic soap component (B).

Filler

Examples of the fillers employable in the invention include flame retardants or flame retarding assistants (brominated polystyrene, poly(brominated styrene), brominated polycarbonate, condensate of brominated phenol, red phosphorus, antimony oxide, sodium antimonate, zinc oxide, iron oxide, magnesium oxide, metallic borate such as zinc borate, etc.), lubricants (metal salts of aliphatic carboxylic acids of 26 to 32 carbon atoms, such as calcium montanate and sodium montanate), fillers in the forms of powder, granule, plate and needle (particularly, silica, alumina, calcium carbonate, titanium dioxide, talc, wollastonite, diatomaceous earth, clay, kaolin, spherical glass, mica, magnesium oxide, zinc oxide, potassium titanate, whisker, etc.), and fibrous fillers.

Examples of the fibrous fillers include glass fiber, potassium titanate fiber, metal coated glass fiber, ceramic fiber, wollastonite, metal carbide fiber, cured metal fiber, asbestos fiber and boron fiber. Examples of organic fillers include aramid fiber and carbon fiber.

Of the fibrous fillers, glass fiber is particularly preferable. By the use of the glass fiber, moldability of the polyamide resin composition is improved, and additionally, a molded product obtained from the thermoplastic resin composition is enhanced in the mechanical properties, such as tensile strength, flexural strength and flexural modulus, and heat resistance properties, such as thermal deformation temperature.

The average length of the fibrous filler is in the range of usually 0.01 to 20 mm, preferably 0.1 to 6 mm, and the aspect ratio thereof is in the range of usually 5 to 2000, preferably 15 to 600. It is preferable to use a fibrous filler having such average length and aspect ratio.

The fibrous filler for the invention may be treated with a silane coupling agent or a titanium coupling agent, prior to use. In this case, it is preferable to subject the fibrous filler to surface treatment with, for example, vinyltriethoxysilane, 2-aminopropyltriethoxysilane or 2-glycidyloxypropyltriethoxysilane.

The fibrous filler in the invention may be coated with a binder (sizing agent). Examples of the binders preferably used include compounds of epoxy type, urethane type, urethane/maleic acid modification type and urethane/amine modification type.

The surface treatment agent and the binder may be used in combination. By the use of the combination, binding properties between the fibrous filler and other components in the composition of the invention are enhanced, and appearance and strength properties are enhanced.

The fibrous filler for the invention can be melt kneaded with the polyamide resin composition, and in this case, the fibrous filler is contained in an amount of preferably 10 to 150 parts by weight, particularly preferably 25 to 100 parts by weight, based on 100 parts by weight of the polyamide resin component A). If the content of the fibrous filler is more than 150 parts by weight, flowability of the polyamide resin composition is markedly lowered, and appearance of the resulting molded article is impaired.

Although there is no specific limitation on other additives employable in the invention, the following additives can be added according to the purpose, within limits not detrimental to the object of the present invention.

Examples of the additives include antioxidants or heat stabilizers (magnesium oxide, zinc oxide, hydrotalcites, phosphorus compound, hindered phenols, hydroquinones, copper halide, iodine compound, etc.), other polymers (olefins, modified olefins, olefin copolymers, such as ethylene/propylene copolymer, ethylene/1-butene copolymer, propylene/ethylene copolymer and propylene/1-butene copolymer, polystyrene, polyamide, polycarbonate, polyacetal, polysulfone, polyphenylene oxide, fluororesin, silicone resin, aliphatic polyamide, etc.), plasticizers, thickening agents, anti-static agents, parting agents, pigments, dyes, nucleating agents and various known additives.

Polyamide Resin Composition

The polyamide resin composition of the invention comprises 100 parts by weight of the polyamide resin component (A) and 0.01 to 5 parts by weight of the metallic soap component (B). The polyamide resin composition contains the metallic soap component (B) in an amount of preferably 0.05 to 2 parts by weight, more preferably 0.2 to 1 part by weight, based on 100 parts by weight of the polyamide resin component (A). The polyamide resin composition of the invention preferably further contain the filler in an amount of 1 to 300 parts by weight based on 100 parts by weight of the polyamide resin component (A). The filler preferably comprises a glass fiber, a flame retardant, a flame retarding assistant and a lubricant, because such a filler has excellent heat resistance. When the filler comprises a glass fiber, a flame retardant, a flame retarding assistant and a lubricant, it is preferable that the glass fiber is contained in an amount of 10 to 150 parts by weight, the flame retardant is contained in an amount of 20 to 70 parts by weight, the flame retarding assistant is contained in an amount of 2 to 15 parts by weight, and the lubricant is contained in an amount of 0.01 to 5 parts by weight, each amount being based on 100 parts by weight of the polyamide resin component (A). When the polyamide resin composition of the invention contains the glass fiber, HDT (heat distortion temperature) of the polyamide resin composition is in the range of 270 to 350° C., preferably 280 to 320° C. For preparing the polyamide resin composition of the invention, various processes publicly known are adoptable. For example, the above components are mixed by a Henschel mixer, a V-type blender, a ribbon blender, a tumbling blender or the like, or after the mixing, the mixture is melt kneaded by a single-screw extruder, a multi-screw extruder, a kneader or a Banbury mixer, followed by granulation or pulverization.

In the case of melt kneading, the polyamide resin composition of the invention can be prepared by heating the polyamide resin component (A) with the metallic soap component (B) to, for example, 280 to 360° C., maintaining it in a molten state, adding thereto the aforesaid fibrous filler, powder filler and various additives when needed, and then kneading them. For the kneading, a usual blending apparatus such as an extruder or a kneader is employable.

The polyamide resin composition of the invention prepared as above is processed into a powder, pellets or other forms, and can be molded into various molded articles using compression molding, injection molding, extrusion molding and the like.

EXAMPLE

The present invention is further described with reference to the following examples, but it should be construed that the invention is in no way limited to those examples.

In the examples and the comparative examples, the analyses and the measurements were carried out in accordance with the following methods.

Intrinsic Viscosity [η]

In 50 ml of a 96.5% sulfuric acid solution, 0.5 g of a polyamide resin was dissolved, and the falling time (sec) of the sample solution was measured by means of an Ubbelohde viscometer under the conditions of 25.0±0.05° C., followed by calculation based on the following formula.

$$[\eta]=\eta SP/C\{(1+0.205\eta SP)\}$$

$$\eta SP=(t-t0)/t0$$

[η]: intrinsic viscosity (dl/g)
ηSP: specific viscosity
C: sample concentration (g/dl)
t: falling time (sec) of sample solution
t0: falling time (sec) of blank sulfuric acid Melting Point The polyamide resin was heated at a rate of 10° C./min to measure an endothermic peak based on the melting of the polyamide resin by the use of a differential scanning calorimeter (DSC) Model 7 manufactured by Perkin Elmer Inc. The endothermic peak based on the melting of the polyamide resin was regarded as a melting point.

Flow Length

The polyamide resin was subjected to injection molding using an injection molding machine (IS55-EPN) manufactured by Toshiba Machine Co., Ltd. under the conditions of a cylinder temperature higher than the melting point of the polyamide resin by 10° C., an injection pressure of 100 MPa, an injection rate of 100 mm/sec and a mold temperature of 120° C., to measure a flow length of a flow (width: 10 mm, thickness: 0.5 mm) of the 50th shot from the beginning of the injection.

Mold Release Power and Shot Stability

The polyamide resin was subjected to injection molding using PS-40E manufactured by Nissei Plastic Industrial Co., Ltd. under the injection conditions of an injection pressure of 150 MPa, an injection rate of 15 cm³/sec, a cylinder temperature higher than the melting point of the polyamide resin by 10° C. and a mold temperature (connector mold) of 85° C., and the mold release power was measured by the use of DLA (data logger analyzer) manufactured by the same company.

With regard to the shot stability, mold release power at the 20th shot and mold release power at the 50th shot were measured, and a difference between them was calculated. A sample having a difference of less than 5 kg/cm² was evaluated as AA, and a sample having a difference of not less than 5 kg/cm² was evaluated as BB.

HDT

HDT was measured in accordance with ASTM D648 under the conditions of a load of 1.82 MPa and a heating rate of 2° C./min.

Flame Retardance

The flame retardance of a specimen having a thickness of 1/32 inch was measured in accordance with UL94, followed by evaluation.

Examples 1 to 4, Comparative Examples 1 to 5

As the polyamide resin (component (A)), the following resin (referred to as "PA6T/66") was used.
Type of polyamide resin: PA6T/66=55/45 (molar ratio)
Formulation:
Diamine component: 50% by mol of 1,6-diaminohexane
Dicarboxylic acid component: 27.5% by mol of terephthalic acid, 22.5% by mol of adipic acid
Intrinsic viscosity [η]: 1.0 dl/g
Melting point (differential scanning calorimeter (DSC) method): 310° C.

The type and the amount of the metallic soap (component (B)) are set forth in Table 1.

A given amount of the metallic soap (component (B)) was dry blended with pellets of the polyamide resin (component (A)), and the resulting blend was evaluated on the flow length, mold release power and shot stability. Polyethylene oxide and aliphatic polyester generally said to contribute to improvement of mold-releasing properties were also subjected to the same evaluation. The results are set forth in Table 1.

Examples 5 to 7, Comparative Example 6

In Examples 5 to 7, the same resin as in Example 1 was used as the polyamide resin (component (A)). In Comparative Example 6, polyamide (referred to as "PA66", intrinsic viscosity [η]: 1.2 dl/g, melting point (differential scanning calorimeter (DSC) method): 260° C.) consisting of 50% by mol of 1,6-diaminohexane and 50% by mol of adipic acid was used as the polyamide resin (component (A)).

The type and the amount of the metallic soap (component (B)) are set forth in Table 2. As the glass fiber, ESC03-615 available from Nippon Electric Glass Co., Ltd. was used in the amount shown in Table 2.

The polyamide resin (component (A)), the metallic soap (component (B)) and the glass fiber were melt blended and pelletized by a twin-screw extruder and then injection molded to obtain a specimen. Then, HDT of the specimen was measured. The results are set forth in Table 2.

Examples 8 to 10, Comparative Example 7

In Examples 8 to 10 and Comparative Example 7, the same resin as in Example 1 was used as the polyamide resin (component (A)).

The type and the amount of the metallic soap (component (B)) are set forth in Table 3. As the glass fiber, ESC03-615 available from Nippon Electric Glass Co., Ltd. was used in the amount shown in Table 3.

As the flame retardant, brominated polystyrene (Pyrocheck 68PB, available from Ferro Corporation) was used in the amount shown in Table 3, and as the flame retarding assistant, sodium antimonate (SA-A, available from Nihon Seiko Co., Ltd.) was used in the amount shown in Table 3.

The above components were melt blended and pelletized by a twin-screw extruder and then injection molded to obtain a specimen. Then, flame retardance, HDT and flowability of the specimen were measured. The results are set forth in Table 3.

TABLE 1

| | | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 |
|---|---|---|---|---|---|---|---|---|---|---|
| Polyamide resin Composition | Type of PA | PA6T /66 | PA6T /66 | PA6T /66 | PA6T /66 | PA6T /66 | PA6T /66 | PA6T /66 | PA6T /66 | PA6T /66 |
| | Amount of PA (part(s) by weight) | 100 | 100 | 100 | 100 | 100 | 100 | 100 | 100 | 100 |
| | Type and amount (parts(s) by weight) of metallic soap | Li-Beh (22 carbon atoms) | 0.5 | 1 | — | 0.5 | — | — | — | — | — |
| | | Mg-Beh (22 carbon atoms) | — | — | 1 | 0.5 | — | — | — | — | — |
| | | Li-St (18 carbon atoms) | — | — | — | — | 1 | — | — | — | — |
| | | Na-Mon (28 carbon atoms) | — | — | — | — | — | 1 | — | — | — |
| | | Ca-Mon (28 carbon atoms) | — | — | — | — | — | — | 1 | — | — |
| | Polyethylene oxide (part(s) by weight) | — | — | — | — | — | — | — | 1 | — |
| | Aliphatic ester (part(s) by weight) | — | — | — | — | — | — | — | — | 1 |
| Evaluation item | Flow length (mm) | 81 | 84 | 88 | 85 | 94 | 75 | 70 | 63 | 56 |
| | Mold release power (kg/cm²) 20th shot | 37 | 36 | 30 | 35 | 45 | 26 | 25 | 22 | 24 |
| | Mold release power (kg/cm²) 50th shot | 37 | 39 | 32 | 37 | 57 | 27 | 25 | 21 | 24 |
| | Shot stability | AA | AA | AA | AA | BB | AA | AA | AA | AA |

Li-Beh: lithium behenate, Mg-Beh: magnesium behenate, Li-St: lithium stearate, Na-Mon: sodium montanate, Ca-Mon: calcium montanate, polyethylene oxide: ET132 (available from Clariant Japan K.K.), aliphatic ester: PED191 (available from Clariant Japan K.K.)

TABLE 2

| | | Ex. 5 | Ex. 6 | Ex. 7 | Comp. Ex. 6 |
|---|---|---|---|---|---|
| Polyamide resin compo- | Type of PA | PA6T /66 | PA6T /66 | PA6T /66 | PA6T /66 |
| | Amount of PA | 100 | 100 | 100 | 100 |

TABLE 2-continued

|  |  | Ex. 5 | Ex. 6 | Ex. 7 | Comp. Ex. 6 |
|---|---|---|---|---|---|
| sition | (part(s) by weight) |  |  |  |  |
|  | Type and amount (part(s) by weight) of metallic soap | Li-Beh (22 carbon atoms) | 0.5 | 1 | — | 1 |
|  |  | Mg-Beh (22 carbon atoms) | — | — | 1 | — |
|  | Glass fiber (part(s) by weight) | 100.5 | 101 | 101 | 101 |
| Evaluation item | HDT (° C.) | 298 | 295 | 295 | 255 |

Li-Beh: lithium behenate, Mg-Beh: magnesium behenate

TABLE 3

|  |  | Ex. 8 | Ex. 9 | Ex. 10 | Comp. Ex. 7 |
|---|---|---|---|---|---|
| Polyamide resin composition | Type of PA | PA6T/66 | PA6T/66 | PA6T/66 | PA66 |
|  | Amount of PA (part(s) by weight) | 40 | 40 | 40 | 40 |
|  | Type and amount (part(s) by weight) of metallic soap | Li-Beh (22 carbon atoms) | 0.2 | 0.4 | — | — |
|  |  | Mg-Beh (22 carbon atoms) | — | — | 0.4 | — |
|  |  | Na-Mon (28 carbon atoms) | — | — | — | 0.4 |
|  | Glass fiber (part(s) by weight) | 30 | 30 | 30 | 30 |
|  | Flame retardant (part(s) by weight) | 26 | 26 | 26 | 26 |
|  | Flame retarding assistant (part(s) by weight) | 4 | 4 | 4 | 4 |
| Evaluation item | Flame retardance | V-0 | V-0 | V-0 | V-0 |
|  | HDT (° C.) | 296 | 295 | 295 | 295 |
|  | Flow length (mm) | 73 | 75 | 76 | 65 |

Li-Beh: lithium behenate, Mg-Beh: magnesium behenate, Na-Mon: sodium montanate

EFFECT OF THE INVENTION

The polyamide resin composition of the invention has excellent heat resistance and is favorably used as a molding material particularly for electric or electronic parts and automotive parts.

Further, the polyamide resin composition of the invention is excellent in flowability, mold-releasing properties and shot stability in the injection molding process.

What is claimed is:

1. A polyamide resin composition comprising 100 parts by weight of a polyamide resin component (A) and 0.01 to 5 parts by weight of a metallic soap component (B), wherein:

the polyamide resin component (A) comprises:

a dicarboxylic acid component (a-1), which comprises a terephthalic acid component, and an aromatic dicarboxylic acid component other than the terephthalic acid component and/or an aliphatic dicarboxylic acid component of 4 to 20 carbon atoms, and a diamine component (a-2) comprising an aliphatic diamine component; and the metallic soap component (B) comprises a monovalent or divalent metal salt of an aliphatic carboxylic acid of 20 to 24 carbon atoms.

2. The polyamide resin composition as claimed in claim 1, wherein the polyamide resin component (A) has an intrinsic viscosity, as measured in 96.5% sulfuric acid at 25° C., of 0.5 to 3.0 dl/g and a melting point, as measured by a differential scanning calorimeter (DSC), of 280 to 330° C.

3. The polyamide resin composition as claimed in claim 1 or claim 2, which further contains at least one filler selected from the group consisting of a flame retardant, flame retarding assistant, metal salt of aliphatic carboxylic acids of 26 to 32 carbon atoms as a lubricant, silica, alumina, calcium carbonate, titanium dioxide, talc, wollastonite, diatomaceous earth, clay, kaolin, spherical glass, mica, magnesium oxide, zinc oxide, potassium titanate, whisker, glass fiber, potassium titanate fiber, metal coated glass fiber, ceramic fiber, fibrous wollastonite, metal carbide fiber, cured metal fiber, asbestos fiber, boron fiber, aramid fiber and carbon fiber, in an amount of 1 to 300 parts by weight based on 100 parts by weight of the polyamide resin component (A).

4. The polyamide resin composition as claimed in claim 3, wherein said filler comprises the glass fiber, the flame retardant, the flame retarding assistant and the lubricant.

5. A molded article comprising the polyamide resin composition of claim 1 or 2.

6. The polyamide resin composition as claimed in claim 1, wherein said aliphatic carboxylic acid of 20 to 25 carbon atoms in component (B) is at least one selected from the group consisting of arachic acid, behenic acid, lignoceric acid and pentacosanoic acid.

* * * * *